(12) United States Patent
Yoshida (10) Patent No.: US 8,078,783 B2
(45) Date of Patent: Dec. 13, 2011

(54) INFORMATION PROCESSING APPARATUS, METHOD FOR CONTROLLING THE SAME, AND RECORDING MEDIUM INCLUDING PROGRAM

(75) Inventor: Kenji Yoshida, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 413 days.

(21) Appl. No.: 12/319,536

(22) Filed: Jan. 8, 2009

(65) Prior Publication Data

US 2009/0216931 A1    Aug. 27, 2009

(30) Foreign Application Priority Data

Jan. 8, 2008   (JP) .................................. 2008-001357

(51) Int. Cl.
*H05K 7/10* (2006.01)
(52) U.S. Cl. .............................. 710/301; 710/14; 710/16
(58) Field of Classification Search .................. 710/300, 710/301, 302, 10, 11, 14, 16, 33
See application file for complete search history.

(56) References Cited

U.S. PATENT DOCUMENTS

| | | | | |
|---|---|---|---|---|
| 6,778,436 B2* | 8/2004 | Piau et al. | ................ | 365/185.03 |
| 6,859,856 B2* | 2/2005 | Piau et al. | ..................... | 711/103 |
| 7,581,040 B2* | 8/2009 | Irisawa | ........................... | 710/33 |
| 7,607,579 B2* | 10/2009 | Yoshida | ........................ | 235/435 |
| 7,832,639 B2* | 11/2010 | Yoshida | ........................ | 235/439 |
| 7,856,518 B2* | 12/2010 | Yoshida | ........................... | 710/74 |
| 2005/0033917 A1* | 2/2005 | Takeuchi | ..................... | 711/115 |

FOREIGN PATENT DOCUMENTS

| | | |
|---|---|---|
| JP | 2004-355476 | 12/2004 |
| JP | 2005-352726 | 12/2005 |
| JP | 2007-172047 | 7/2007 |
| JP | 2007-172511 | 7/2007 |
| JP | 2007-183879 | 7/2007 |
| JP | 2007-241523 | 9/2007 |
| JP | 2008-107876 | 5/2008 |

OTHER PUBLICATIONS

PCMCIA Interface User Manual, Sep. 9, 2005.*
Transcent Industrial CF Card, Feb. 8, 2006.*

* cited by examiner

*Primary Examiner* — Khanh Dang
(74) *Attorney, Agent, or Firm* — Nutter McClennen & Fish LLP; John J. Penny, Jr.; Christina M. Sperry (57) ABSTRACT

An information processing apparatus includes a card slot to which a card-type medium is inserted, a determination unit configured to determine an operation mode, from among a first, second and third operation modes, which attains the highest speed of data communication between the information processing apparatus and the cardtype medium on the basis of a first, second and third communication speeds and the interruption-preventing maximum data size, and a data communication unit configured to perform data communication between the information processing apparatus and the card-type medium in the operation mode which attains the highest speed of the data communication and which is selected from among the first to third operation modes by the determination unit.

7 Claims, 10 Drawing Sheets

| PIO MODE | CYCLE TIME |
|---|---|
| PIO MODE 0 | 600ns |
| PIO MODE 1 | 383ns |
| PIO MODE 2 | 240ns |
| PIO MODE 3 | 180ns |
| PIO MODE 4 | 120ns |
| PIO MODE 5 | 100ns |
| PIO MODE 6 | 80ns |

CYCLE TIME OF True IDE MODE IN PIO MODE

FIG. 7

| Ultra DMA MODE | CYCLE TIME |
|---|---|
| Ultra DMA MODE 0 | 112ns |
| Ultra DMA MODE 1 | 73ns |
| Ultra DMA MODE 2 | 54ns |
| Ultra DMA MODE 3 | 39ns |
| Ultra DMA MODE 4 | 25ns |
| Ultra DMA MODE 5 | 16.8ns |
| Ultra DMA MODE 6 | 13ns |

CYCLE TIME OF True IDE MODE IN Ultra DMA MODE

FIG. 8

| | PIO MODE 0 | PIO MODE 1 | PIO MODE 2 | PIO MODE 3 | PIO MODE 4 | PIO MODE 5 | PIO MODE 6 |
|---|---|---|---|---|---|---|---|
| 250ns | MEMORY | MEMORY | True IDE | True IDE | True IDE | True IDE | True IDE |
| 150ns | MEMORY | MEMORY | MEMORY | True IDE | True IDE | True IDE | True IDE |
| 120ns | MEMORY | MEMORY | MEMORY | MEMORY | True IDE | True IDE | True IDE |
| 100ns | MEMORY | MEMORY | MEMORY | MEMORY | MEMORY | True IDE | True IDE |
| 80ns | MEMORY | MEMORY | MEMORY | MEMORY | MEMORY | MEMORY | True IDE |

|  | PIO MODE 0 | PIO MODE 1 | PIO MODE 2 | PIO MODE 3 | PIO MODE 4 | PIO MODE 5 | PIO MODE 6 |
|---|---|---|---|---|---|---|---|
| 250ns | MEMORY | MEMORY | True IDE | True IDE | True IDE | True IDE | True IDE |
| 150ns | MEMORY | MEMORY | MEMORY | True IDE | True IDE | True IDE | True IDE |
| 120ns | MEMORY | MEMORY | MEMORY | MEMORY | True IDE | True IDE | True IDE |
| 100ns | MEMORY | MEMORY | MEMORY | MEMORY | True IDE | True IDE | True IDE |
| 80ns | MEMORY | MEMORY | MEMORY | MEMORY | MEMORY | True IDE | True IDE |

FIG. 10

| | PIO MODE 0 | PIO MODE 1 | PIO MODE 2 | PIO MODE 3 | PIO MODE 4 | PIO MODE 5 | PIO MODE 6 |
|---|---|---|---|---|---|---|---|
| 250ns | MEMORY | MEMORY | True IDE | True IDE | True IDE | True IDE | True IDE |
| 150ns | MEMORY | MEMORY | MEMORY | True IDE | True IDE | True IDE | True IDE |
| 120ns | MEMORY | MEMORY | MEMORY | MEMORY | True IDE | True IDE | True IDE |
| 100ns | MEMORY | MEMORY | MEMORY | MEMORY | True IDE | True IDE | True IDE |
| 80ns | MEMORY | MEMORY | MEMORY | MEMORY | True IDE | True IDE | True IDE |

|  | PIO MODE 0 | PIO MODE 1 | PIO MODE 2 | PIO MODE 3 | PIO MODE 4 | PIO MODE 5 | PIO MODE 6 |
|---|---|---|---|---|---|---|---|
| 250ns | MEMORY | True IDE | True IDE | True IDE | True IDE | True IDE | True IDE |
| 150ns | MEMORY | MEMORY | True IDE | True IDE | True IDE | True IDE | True IDE |
| 120ns | MEMORY | MEMORY | MEMORY | True IDE | True IDE | True IDE | True IDE |
| 100ns | MEMORY | MEMORY | MEMORY | True IDE | True IDE | True IDE | True IDE |
| 80ns | MEMORY | MEMORY | MEMORY | MEMORY | True IDE | True IDE | True IDE |

| | Ultra DMA MODE | | | | | | |
|---|---|---|---|---|---|---|---|
| | MODE 0 | MODE 1 | MODE 2 | MODE 3 | MODE 4 | MODE 5 | MODE 6 |
| PIO MODE 0 | UDMA | UDMA | UDMA | UDMA | UDMA | UDMA | UDMA |
| PIO MODE 1 | UDMA | UDMA | UDMA | UDMA | UDMA | UDMA | UDMA |
| PIO MODE 2 | UDMA | UDMA | UDMA | UDMA | UDMA | UDMA | UDMA |
| PIO MODE 3 | UDMA | UDMA | UDMA | UDMA | UDMA | UDMA | UDMA |
| PIO MODE 4 | UDMA | UDMA | UDMA | UDMA | UDMA | UDMA | UDMA |
| PIO MODE 5 | UDMA | UDMA | UDMA | UDMA | UDMA | UDMA | UDMA |
| PIO MODE 6 | PIO | UDMA | UDMA | UDMA | UDMA | UDMA | UDMA |

PIO: PIO MODE
UDMA: Ultra DMA MODE

INFORMATION PROCESSING APPARATUS, METHOD FOR CONTROLLING THE SAME, AND RECORDING MEDIUM INCLUDING PROGRAM

The entire disclosure of Japanese Patent Application No. 2008-001357, filed Jan. 8, 2008 is expressly incorporated by reference herein.

BACKGROUND

1. Technical Field

The present invention relates to information processing apparatuses, methods for controlling the information processing apparatuses, and recording media including programs. The invention particularly relates to an information processing apparatus in which an appropriate operation mode is selected from among a plurality of operation modes used for data communication with a card-type medium, a method for controlling the information processing apparatus, and a recording medium including a program.

2. Related Art

In general, an example of a card-type medium which is used to store data in an information processing apparatus such as a personal computer and which is used for data communication includes a CF (Compact Flash (registered trademark)) card. Information processing apparatuses compatible with CF cards have card slots for the CF cards. When users insert the CF cards into the card slots, the information processing apparatuses access the CF cards.

The CF cards include memory cards and IC cards. When an information processing apparatus performs data transmission with a memory card, which is a CF card inserted into a card slot, a memory mode or a TrueIDE mode is selectively used. One of the operation modes is arbitrarily selected for the data transmission with the CF card. However, when the TrueIDE mode is used, high communication speed is likely to be attained. Therefore, in general, the information processing apparatus checks an operation mode compatible with the inserted CF card, and when it is determined that the CF card is compatible with the TrueIDE mode, the information processing apparatus accesses the CF card in the TrueIDE mode whereas when it is determined that the CF card is not compatible with the TrueIDE mode, the information processing apparatus accesses the CF card in the memory mode (refer to Japanese Unexamined Patent Application Publication No. 2004-355476, for example).

However, in some CF cards, a communication speed in the memory mode is higher than that in the TrueIDE mode. In this case, when the information processing apparatus performs data communication with such a CF card in the memory mode, a shorter data transmission time is attained.

In addition, the TrueIDE mode includes a PIO mode and an Ultra DMA mode. When the Ultra DMA mode included in the TrueIDE mode is used, a shorter data transmission time is attained when compared with data communication performed in the PIO mode included in the TrueIDE mode. Therefore, by selecting an operation mode compatible with a CF card is appropriately determined so that an appropriate operation mode which attains the shortest data transmission time, usability for the users is improved.

SUMMARY

An advantage of some aspects of the invention is to provide an information processing apparatus in which an appropriate operation mode is selected from among a plurality of operation modes used for data communication with a card-type medium, a method for controlling the information processing apparatus, and a recording medium including a program.

According to an aspect of the invention, there is provided an information processing apparatus including a card slot to which a card-type medium is inserted, a first communication-speed obtaining unit configured to obtain a first communication speed which is a speed of data communication between the information processing apparatus and the card-type medium in a first operation mode, a second communication-speed obtaining unit configured to obtain a second communication speed which is a speed of data communication between the information processing apparatus and the card-type medium in a second operation mode, a third communication-speed obtaining unit configured to obtain a third communication speed which is a speed of data communication between the information processing apparatus and the card-type medium in a third operation mode, an interruption-preventing maximum data size obtaining unit configured to obtain an interruption-preventing maximum data size which is a maximum data size which allows data communication between the information processing apparatus and the card-type medium without interruption in the second operation mode, a determination unit configured to determine an operation mode, from among the first to third operation modes, which attains the highest speed of data communication between the information processing apparatus and the card-type medium on the basis of the first to third communication speeds and the interruption-preventing maximum data size, and a data communication unit configured to perform data communication between the information processing apparatus and the card-type medium in the operation mode which attains the highest speed of the data communication and which is selected from among the first to third operation modes by the determination unit.

In this case, the first communication-speed obtaining unit may obtain the first communication speed when the card-type medium is newly detected in the card slot, and the second communication-speed obtaining unit may obtain the second communication speed when the card-type medium is newly detected in the card slot. Similarly, the third communication-speed obtaining unit may obtain the third communication speed when the card-type medium is newly detected in the card slot. Furthermore, the interruption-preventing maximum data size obtaining unit may obtain the interruption-preventing maximum data size when the card-type medium is newly detected in the card slot, and the determination unit may determine the operation mode which attains the highest speed of data communication from among the first to third operation modes when the card-type medium is newly detected in the card slot.

In addition, the information processing apparatus may further include different mode selection tables for a plurality of different interruption-preventing maximum data sizes defined in advance in the second operation mode. Each of the mode selection tables may be used to select an operation mode which attains the highest speed of data communication in accordance with a combination of a value of the first communication speed and a value of the second communication speed when the data communication is performed in the second operation mode on the basis of a corresponding one of the interruption-preventing maximum data sizes. The determination unit may select one of the mode selection tables which corresponds to the interruption-preventing maximum data size of the card-type medium inserted into the card slot, and may determine an operation mode, from among the first and second operation modes, which attains the highest speed of data communication between the information processing apparatus and the card-type medium with reference to the selected mode selection table.

The card-type medium may be a Compact Flash (registered trademark) card.

In this case, the first operation mode may correspond to a memory mode, the second operation mode may correspond to a PIO mode included in a TrueIDE mode, the third operation mode may correspond to an Ultra DMA mode included in the TrueIDE mode, and the interruption-preventing maximum data size may correspond to the maximum number of sectors.

In this case, when the card-type medium is compatible with an Ultra DMA mode, the determination unit may select the Ultra DMA mode as an operation mode which attains the highest speed of data communication.

According to another aspect of the invention, there is provided a method for controlling an information processing apparatus including a card slot to which a card-type medium is inserted. The method includes obtaining a first communication speed which is a speed of data communication between the information processing apparatus and the card-type medium in a first operation mode, obtaining a second communication speed which is a speed of data communication between the information processing apparatus and the card-type medium in a second operation mode, obtaining a third communication speed which is a speed of data communication between the information processing apparatus and the card-type medium in a third operation mode, obtaining an interruption-preventing maximum data size which is a maximum data size which allows data communication between the information processing apparatus and the card-type medium without interruption in the second operation mode, determining an operation mode, from among the first to third operation modes, which attains the highest speed of data communication between the information processing apparatus and the card-type medium on the basis of the first to third communication speeds and the interruption-preventing maximum data size, and performing the data communication between the information processing apparatus and the card-type medium in the operation mode which attains the highest speed of the data communication and which is selected from among the first to third operation modes by the determination unit.

According to a further aspect of the invention, there is provided a recording medium including a program which is executed by an information processing apparatus. The program includes obtaining a first communication speed which is a speed of data communication between the information processing apparatus and the card-type medium in a first operation mode, obtaining a second communication speed which is a speed of data communication between the information processing apparatus and the card-type medium in a second operation mode, obtaining a third communication speed which is a speed of data communication between the information processing apparatus and the card-type medium in a third operation mode, obtaining an interruption-preventing maximum data size which is a maximum data size which allows data communication between the information processing apparatus and the card-type medium without interruption in the second operation mode, determining an operation mode, from among the first to third operation modes, which attains the highest speed of data communication between the information processing apparatus and the card-type medium on the basis of the first to third communication speeds and the interruption-preventing maximum data size, and performing the data communication between the information processing apparatus and the card-type medium in the operation mode which attains the highest speed of the data communication and which is selected from among the first to third operation modes by the determination unit.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the present invention will be described hereinafter with reference to the accompanying drawings. Note that technical fields of the invention are not limited to the embodiment described below.

Figure 1:
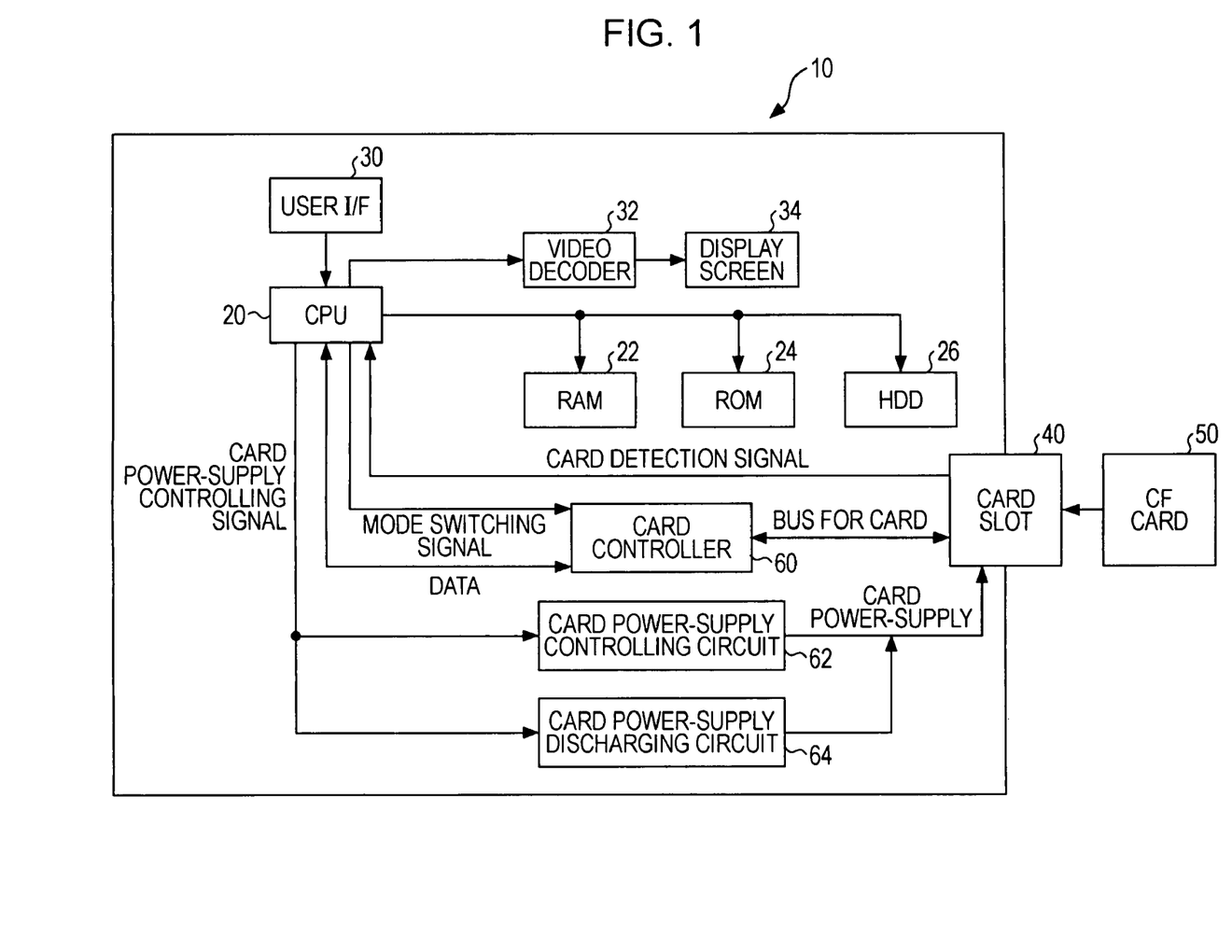
FIG. 1 is a block diagram illustrating an internal configuration of an information processing apparatus according to an embodiment of the invention.

FIG. 1 is a block diagram illustrating an example of an internal configuration of an information processing apparatus 10 according to the embodiment of the invention. The information processing apparatus 10 corresponds to one of various information processing apparatuses each including card slots, such as small mobile information terminals, digital still cameras, laptop computers, and desktop computers.

As shown in FIG. 1, the information processing apparatus 10 of this embodiment includes a CPU (Central Processing Unit) 20, a RAM (Random Access Memory) 22, a ROM (Read Only Memory) 24, a hard disk drive 26, a user interface 30, a video decoder 32, and a display screen 34.

The CPU 20, the RAM 22, the ROM 24, and the hard disk drive 26 are connected to one another through an internal bus. Therefore, the CPU 20 can arbitrarily access the RAM 22, the ROM 24, and the hard disk drive 26 through the internal bus.

The CPU 20 outputs image data to the video decoder 32 which decodes the image data, and the decoded image data is displayed in the display screen 34. The display screen 34 is constituted by an LCD (Liquid Crystal Display) or a CRT (Cathode Ray Tube). Note that the display screen 34 may be integrally disposed on the information processing apparatus 10, or may be externally attached to the information processing apparatus 10.

The CPU 20 receives various operation instructions issued by a user through the user interface 30. The user interface 30 includes a single or a plurality of buttons, a keyboard, or a pointing device, or a combination thereof, for example. In the example shown in FIG. 1, the user interface 30 is included in the information processing apparatus 10. However, the user interface 30 may be externally attached to the information processing apparatus 10. The CPU 20 performs various operations in accordance with the operation instructions supplied from the user interface 30.

Furthermore, the information processing apparatus 10 of this embodiment includes a card slot 40. In this embodiment, a CF card 50 is inserted into the card slot 40 by the user. Still image data and moving image data stored in the CF card 50 are read by the information processing apparatus 10 and are displayed in the display screen 34.

In this embodiment, it is assumed that various types of CF card 50 are inserted into the card slot 40 by the user. That is, it is assumed that various CF cards 50 compatible with various modes are inserted into the card slot 40.

In particular, it is assumed that a memory card which is the CF card capable of operating in a memory mode and a TrueIDE mode is inserted into the card slot 40. In this embodiment, an error occurs when an I/O card which operates in a card I/O mode is inserted into the card slot 40. It is apparent that when other standards are newly set, CF cards compatible with the newly set standards may be inserted into the information processing apparatus 10.

The CF card 50 inserted in the card slot 40 is controlled by the CPU 20 through a card controller 60. That is, the CPU 20 determines whether the CF card 50 is inserted into the card slot 40 in accordance with a card detection signal output from the card slot 40. When it is determined that the CF card 50 is inserted into the card slot 40, the CPU 20 outputs a mode switching signal to a card controller 60 and determines whether an access operation is performed in the memory mode or in the TrueIDE mode. When the information processing apparatus 10 supports the card I/O mode, the information processing apparatus 10 may enter the card I/O mode in accordance with the mode switching signal.

The card controller 60 and the card slot 40 are connected to each other through a bus for a card. Data communication is performed between the CPU 20 and the CF card 50 inserted into the card slot 40 through the card controller 60.

A card power-supply controlling circuit 62 supplies electric power for a card through a power supply line to the CF card 50 inserted into the card slot 40. A determination as to whether the card power-supply controlling circuit 62 supplies the electric power for a card is made on the basis of a card power-supply controlling signal output from the CPU 20. That is, when the CPU 20 detects the CF card 50 inserted into the card slot 40 or when the CPU 20 is accessing the CF card 50, the CPU 20 outputs, to the card power-supply controlling circuit 62, the card power-supply controlling signal used to supply the electric power for a card. On the other hand, when the CPU 20 detects removal of the CF card 50, or when the CPU 20 is brought out of a card accessing state, the CPU 20 outputs, to the card power-supply controlling circuit 62, the card power-supply controlling signal which instructs stop of supply of the electric power for a card. For example, in this embodiment, the card power-supply controlling signal is in a high level when the electric power for a card is to be supplied whereas the card power-supply controlling signal is in a low level when the electric power for a card is not to be supplied.

In this embodiment, the card power-supply controlling signal output from the CPU 20 is also supplied to a card power-supply discharging circuit 64. The card power-supply discharging circuit 64 is turned on or off in accordance with the card power-supply controlling signal. Specifically, when the card power-supply controlling signal representing that the electric power for a card is not to be supplied is transmitted, the card power-supply discharging circuit 64 is brought to an operation state, and a power supply line used to supply the electric power for a card is connected to the ground through a resistor. Therefore, when the electric power for a card is not to be supplied, the electric power for a card of the power-supply line is forced to be discharged by the card power-supply discharging circuit 64, and a level of the electric power for a card is rapidly lowered to a ground level. On the other hand, when the card power-supply controlling signal representing that the electric power for a card is to be supplied is transmitted, the card power-supply discharging circuit 64 is brought to a non-operation state, and the power-supply line of the electric power for a card is not connected to the ground. Therefore, current is prevented from being unnecessarily supplied from the power-supply line to the ground while the electric power for a card is supplied. Note that the card power-supply discharging circuit 64 is not essential and therefore may be omitted in this embodiment.

Note that a condition in which the electric power for a card is to be supplied or a condition in which the electric power for a card is not to be supplied is appropriately set in accordance with specification of the information processing apparatus 10 or specification of the CF card 50.

Figure 2:
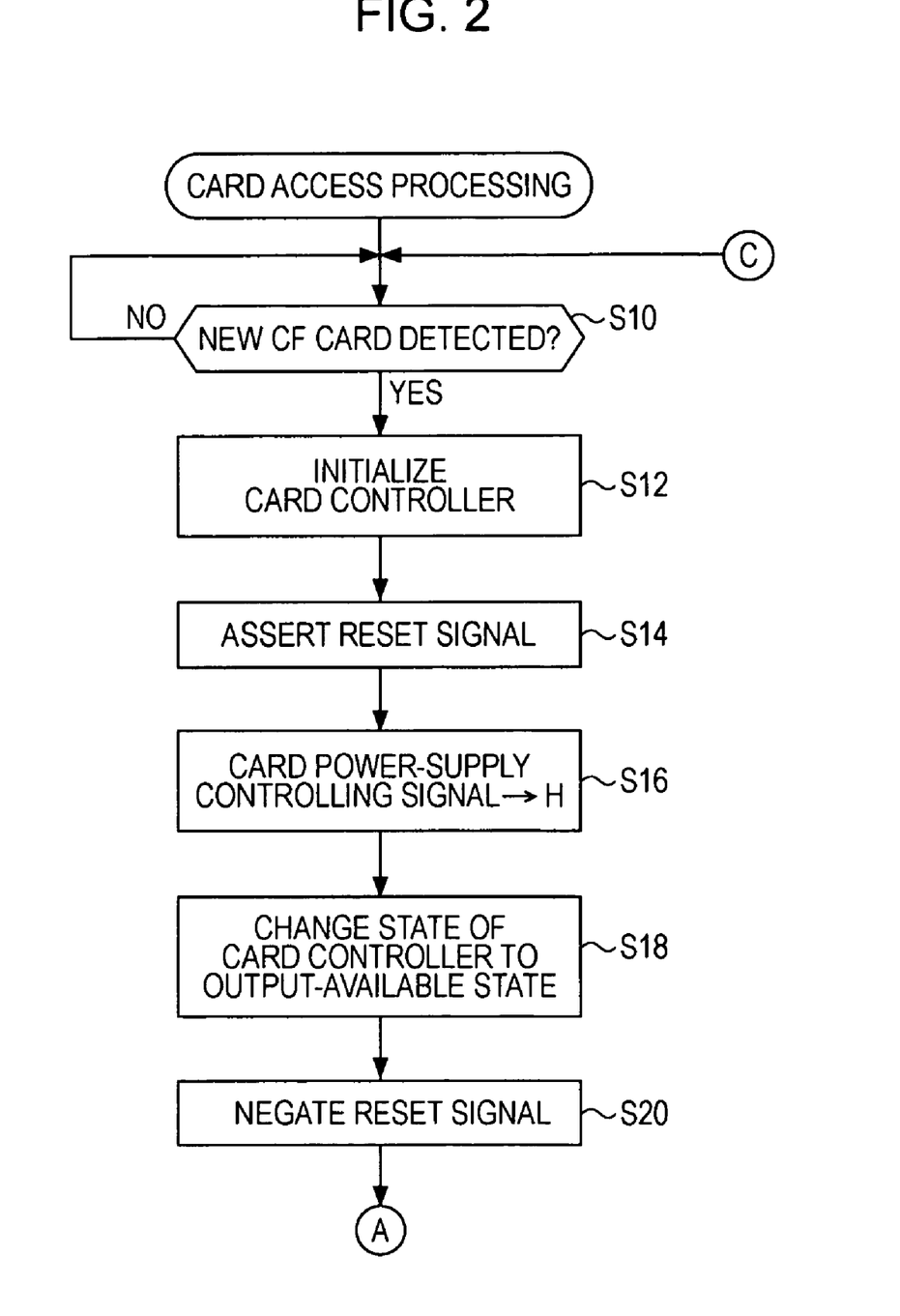
FIG. 2 is a first flowchart illustrating an example of card access processing performed by the information processing apparatus shown in FIG. 1.
Figure 3:
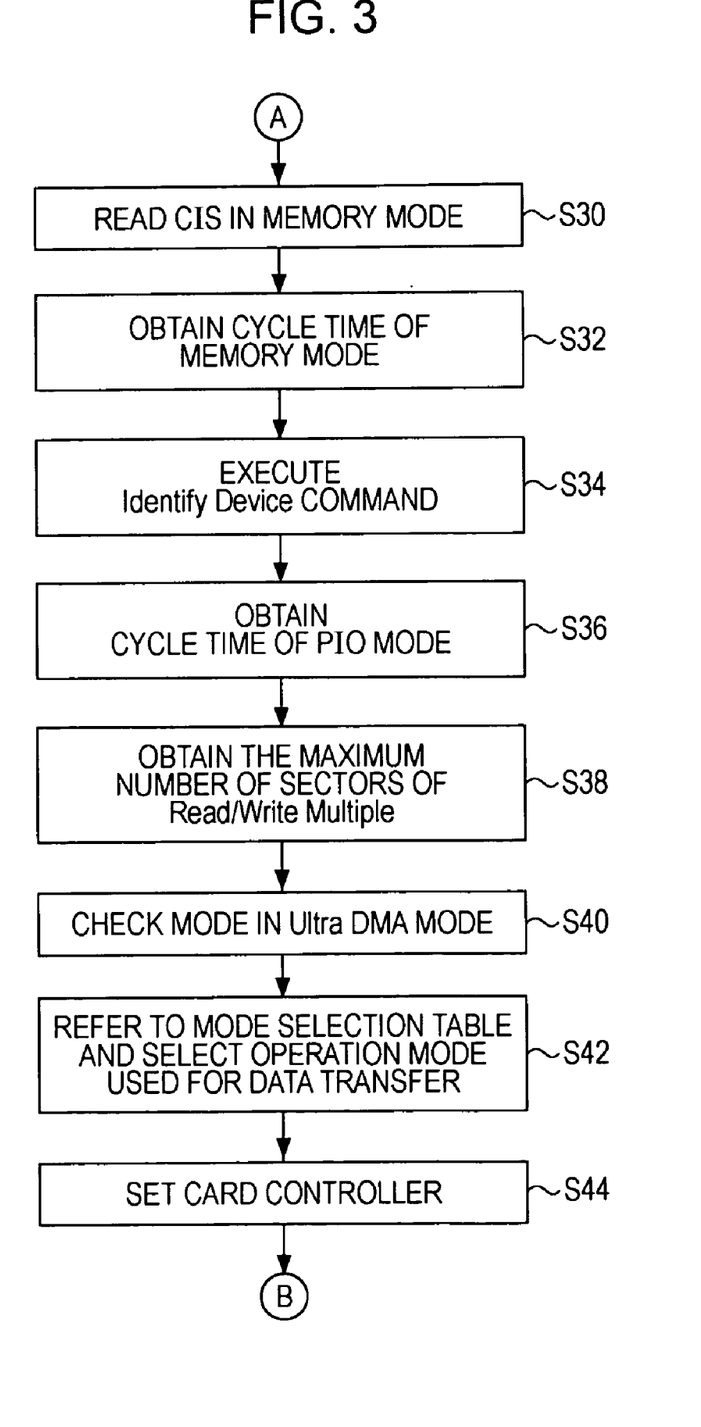
FIG. 3 is a second flowchart illustrating the example of the card access processing performed by the information processing apparatus shown in FIG. 1.
Figure 4:
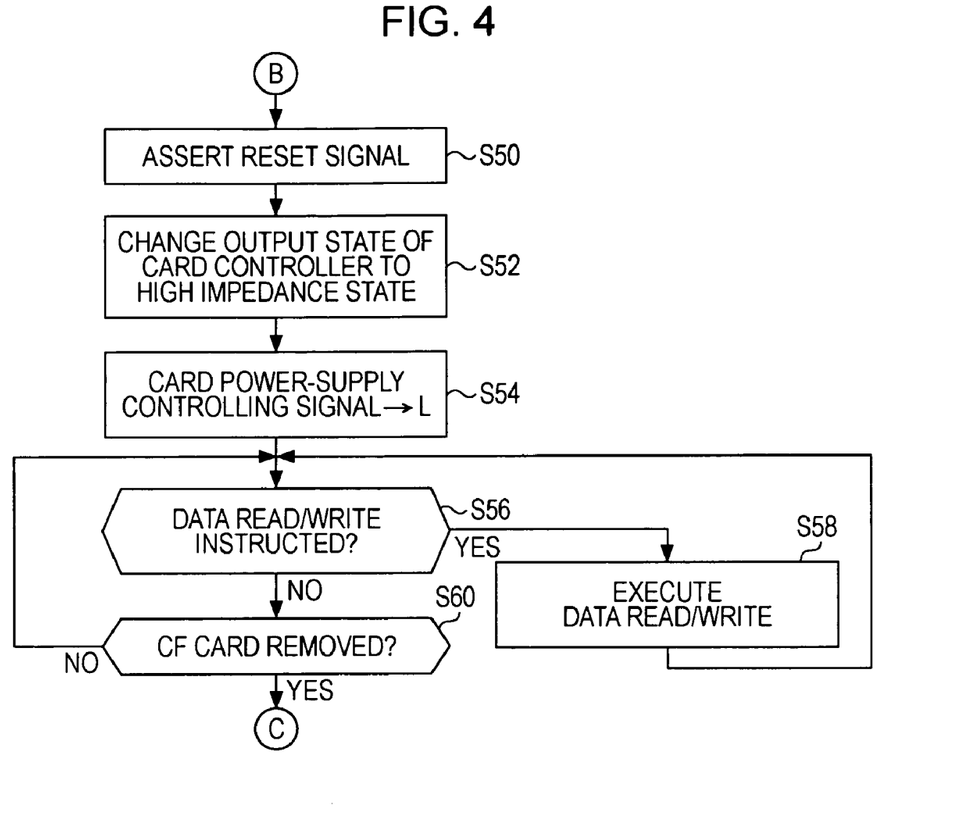
FIG. 4 is a third flowchart illustrating the example of the card access processing performed by the information processing apparatus shown in FIG. 1.

Referring to FIGS. 2 to 4, card access processing normally performed by the information processing apparatus 10 will be described. The card access processing is realized by reading and executing a card-access processing program stored in the ROM 24 or the hard disk drive 26 by the CPU 20. The card access processing is automatically activated when the information processing apparatus 10 is turned on.

As shown in FIG. 2, the information processing apparatus 10 determines whether the CF card 50 is inserted into the card slot 40 in step S10. In this embodiment, the determination as to whether the CF card 50 is newly inserted into the card slot 40 is made in accordance with the card detection signal output from the card slot 40. Specifically, when levels of signals CD1 and CD2 of the card slot 40 are changed from high levels to low levels, the information processing apparatus 10 determines that the CF card 50 is inserted into the card slot 40. Furthermore, in this embodiment, the information processing apparatus 10 checks the signals CD1 and CD2 of the card slot 40 upon being turned on. Here, even when the levels of the signals CD1 and CD2 are low levels at a time when the information processing apparatus 10 is turned on and the CF card 50 has been inserted into the card slot 40, the information processing apparatus 10 determines that the CF card 50 is newly inserted into the card slot 40. That is, in this embodiment, while the CF card 50 is inserted into the card slot 40, the signals CD1 and CD2 are in the low levels whereas while the CF card 50 is not inserted into the card slot 40, the signals CD1 and CD2 are in the high levels.

When the determination is negative in step S10, the operation of step S10 is performed again. This operation is repeatedly performed until it is determined that the CF card 50 is newly inserted into the card slot 40.

On the other hand, when the determination is affirmative in step S10, the information processing apparatus 10 initializes the card controller 60 in step S12.

Then, the information processing apparatus 10 asserts a RESET signal of the CF card 50 in step S14. Subsequently, the information processing apparatus 10 changes a level of the card power-supply controlling signal from a low level to a high level so as to start supply of the electric power for a card in step S16. At this time, the CF card 50 is activated in the memory mode.

Then, the information processing apparatus 10 changes a state of an interface provided on a card side of the card controller 60 from a high impedance state to an output-available state in step S18. Thereafter, the information processing apparatus 10 negates the RESET signal in step S20.

Then, as shown in FIG. 3, the information processing apparatus 10 reads CIS information, which is card attribute information, in the memory mode in step S30.

Subsequently, the information processing apparatus 10 checks and obtains a cycle time of the CF card 50 inserted into the card slot 40 in the memory mode on the basis of the read CIS information in step S32.

Figure 5:
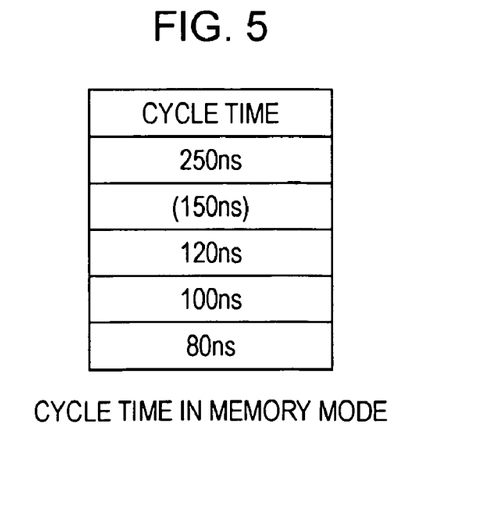
FIG. 5 is a table listing cycle times in a memory mode.

FIG. 5 is a table listing possible cycle times of the CF card 50 in a memory mode. As shown in FIG. 5, in this embodiment, the CF card 50 operates with a cycle time selected from cycle times of 250 ns, 150 ns, 120 ns, 100 ns, and 80 ns. The cycle time employed in the operation of the CF card 50 is determined in accordance with bit 2 to bit 0 of a device ID included in a byte 2 of a CISTPL_DEVICE tuple included in the CIS information. Accordingly, in step S32, the cycle time employed in the operation of the inserted CF card 50 is determined on the basis of the read CIS information. Furthermore, a communication speed in the memory mode is determined on the basis of the determined cycle time. Note that the cycle time corresponds to one cycle of a basic operation clock, and therefore, the shorter the cycle time is, the faster a basic operation is.

Note that although the cycle time of 150 ns is not compatible with a standard of CF+ and Compact Flash Specification Revision 4.1, some normal CF cards or some Microdrives (registered trademark) incorporating hard disk drives operate with a cycle time of 150 ns. Therefore, the information processing apparatus 10 of this embodiment is compatible with CF cards and Microdrives which operate with a cycle time of 150 ns.

Then, the information processing apparatus 10 executes an IDENTIFY DEVICE command in step S34, and obtains a cycle time in the PIO mode included in the TrueIDE mode in step S36. That is, different types of CF cards have different compatible operation modes in the True IDE mode, and such CF cards have different communication speeds, that is, different cycle times, due to the different compatible operation modes. Therefore, the information processing apparatus 10 should check a compatible operation mode.

In general, the TrueIDE mode mainly includes three operation modes, i.e., the PIO mode, a Multiword DMA mode, and the Ultra DMA mode. Each of these three operation modes further includes a plurality of modes which are categorized by speed. It is assumed that the information processing apparatus 10 of this embodiment is compatible with the PIO mode and Ultra DMA mode among these three operation modes.

Furthermore, it is assumed that the information processing apparatus 10 of this embodiment is compatible with a PIO mode of Revision 4.1 (CF+ and Compact Flash Specification Revision 4.1), which is the latest revision. The PIO mode of the Revision 4.1 includes PIO modes 0 to 6. The information processing apparatus 10 determines one of the PIO modes 0 to 6 which is compatible with the inserted CF card 50. On the other hand, the Ultra DMA mode of the Revision 4.1 includes Ultra DMA modes 0 to 6, and the information processing apparatus 10 determines one of the Ultra DMA modes 0 to 6 which is compatible with the inserted CF card 50.

Figure 6:
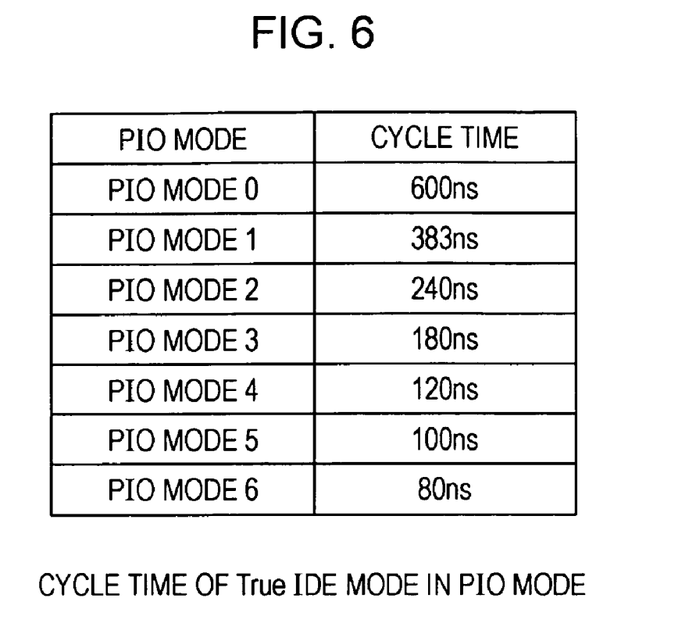
FIG. 6 is a table listing cycle times in a PIO mode included in a TrueIDE mode.

FIG. 6 shows a table listing cycle times in the modes 0 to 6 included in the PIO mode. As shown in FIG. 6, in the PIO mode, the mode 0 attains the lowest communication speed and has a cycle time of 600 ns, and the communication speeds of the modes 1 to 6 become higher in an order from the mode 1 to the mode 6. In the mode 6, the cycle time is 80 ns.

Note that the IDENTIFY DEVICE command may be executed in the memory mode or the TrueIDE mode. In a case where the IDENTIFY DEVICE command is executed in the memory mode, the IDENTIFY DEVICE command is executed immediately after the operation of step S30. On the other hand, when the IDENTIFY DEVICE command is executed in the TrueIDE mode, supply of the electric power for a card to the CF card 50 is temporarily stopped, and after the electric power for a card sufficiently falls, a level of an OE signal is fixed to the ground level and the supply of the electric power for a card is restarted so that the CF card 50 is activated in the TrueIDE mode, and thereafter, the IDENTIFY DEVICE command is executed.

In step S38, the information processing apparatus 10 obtains the maximum number of sectors in a READ/WRITE MULTIPLE block of the CF card 50. Specifically, the information processing apparatus 10 obtains the maximum number of sectors which supports READ/WRITE MULTIPLE by executing the IDENTIFY DEVICE command in step S34. In this embodiment, in a signal serving as a response from the CF card 50 obtained in response to the IDENTIFY DEVICE command, values of eight bits, i.e., values of bits 7 to 0 of Word 47 are checked and determined.

Possible values of the maximum number of sectors represented by the eight bits, that is, the bits 7 to 0 of Word 47 theoretically include 2, 4, 8, 16, 32, 64, and 128, and products which are commercially available often employ a value 2, 4, or 8. Therefore, it is assumed that the maximum number of sectors is 2, 4, or 8 in this embodiment. Note that the information processing apparatus 10 may be designed assuming that other values are employed for the maximum number of sectors.

In a case where a normal READ SECTOR command or a normal WRITE SECTOR command is used in data communication between the information processing apparatus 10 and the CF card 50, an interruption occurs for each sector in data transmission. On the other hand, in a case where a READ MULTIPLE command or a WRITE MULTIPLE command is used, interruptions occur only in predetermined sectors. Therefore, a period of time required for the data transmission in the case where the READ MULTIPLE command or the WRITE MULTIPLE command is used is shorter than a period of time required for the data transmission in the case where the READ SECTOR command or the WRITE SECTOR command is used. In the case where the READ MULTIPLE command or the WRITE MULTIPLE command is used, the number of sectors is set in response to a SET MULTIPLE MODE command. Note that since the larger the number of sectors is, the lower the frequency of the interruptions is, the number of sectors may correspond to the maximum number of sectors supported by the CF card 50.

Then, as shown in FIG. 3, the information processing apparatus 10 determines whether the CF card 50 is compatible with the Ultra DMA mode, and if the determination is affirmative, the information processing apparatus 10 further determines a type of the Ultra DMA mode in step S40.

Figure 7:
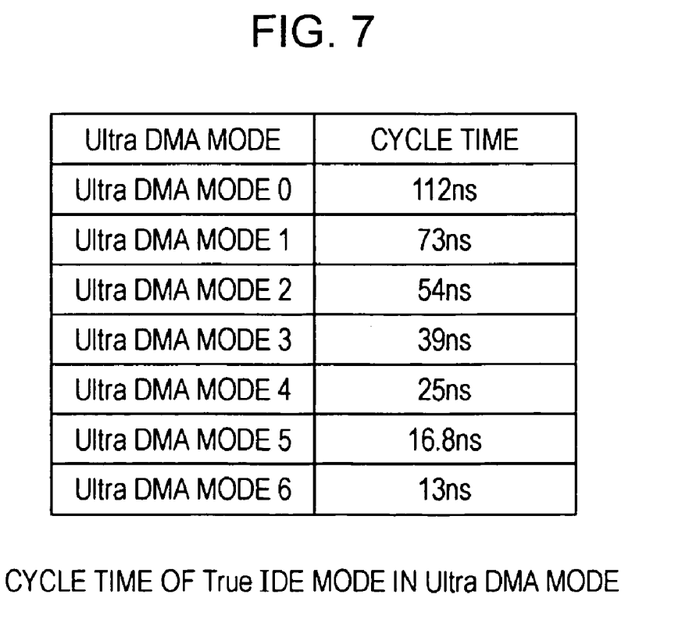
FIG. 7 is a table listing cycle times in an Ultra DMA mode included in the TrueIDE mode.

FIG. 7 shows a table listing cycle times in the modes 0 to 6 included in the Ultra DMA mode. As shown in FIG. 7, in the Ultra DMA mode, the mode 0 attains the lowest communication speed and has a cycle time of 112 ns, and the communication speeds of the modes 1 to 6 become higher in an order from the mode 1 to the mode 6. In the mode 6, the cycle time is 13 ns.

In this embodiment, in the signal serving as the response from the CF card 50 obtained in response to the IDENTIFY DEVICE command, the information processing apparatus 10 checks values of seven bits, i.e., values of bits 6 to 0 of Word 88. The information processing apparatus 10 further determines whether the CF card 50 is compatible with the Ultra DMA mode, and if the determination is affirmative, the information processing apparatus 10 further determines a type of the Ultra DMA mode.

Specifically, in a case where all the seven bits, i.e., the bits 6 to 0 of Word 88 are 0, it is determined that the CF card 50 is not compatible with the Ultra DMA mode. On the other hand, in a case where the bit 6 is 1, it is determined that the CF card 50 is compatible with the Ultra DMA mode 6, in a case where the bit 5 is 1, it is determined that the CF card 50 is compatible with the Ultra DMA mode 5, in a case where the bit 4 is 1, it is determined that the CF card 50 is compatible with the Ultra DMA mode 4, in a case where the bit 3 is 1, it is determined that the CF card 50 is compatible with the Ultra DMA mode 3, in a case where the bit 2 is 1, it is determined that the CF card 50 is compatible with the Ultra DMA mode 2, and in a case where the bit 1 is 1, it is determined that the CF card 50 is compatible with the Ultra DMA mode 1.

Then, as shown in FIG. 3, the information processing apparatus 10 refers to a mode selection table so as to select an operation mode used for data transmission in step S42. FIGS. 8 to 11 show examples of configurations of mode selection tables of this embodiment. In this embodiment, the mode selection tables are stored in the ROM 24 or the hard disk drive 26 in advance.

Figure 8:
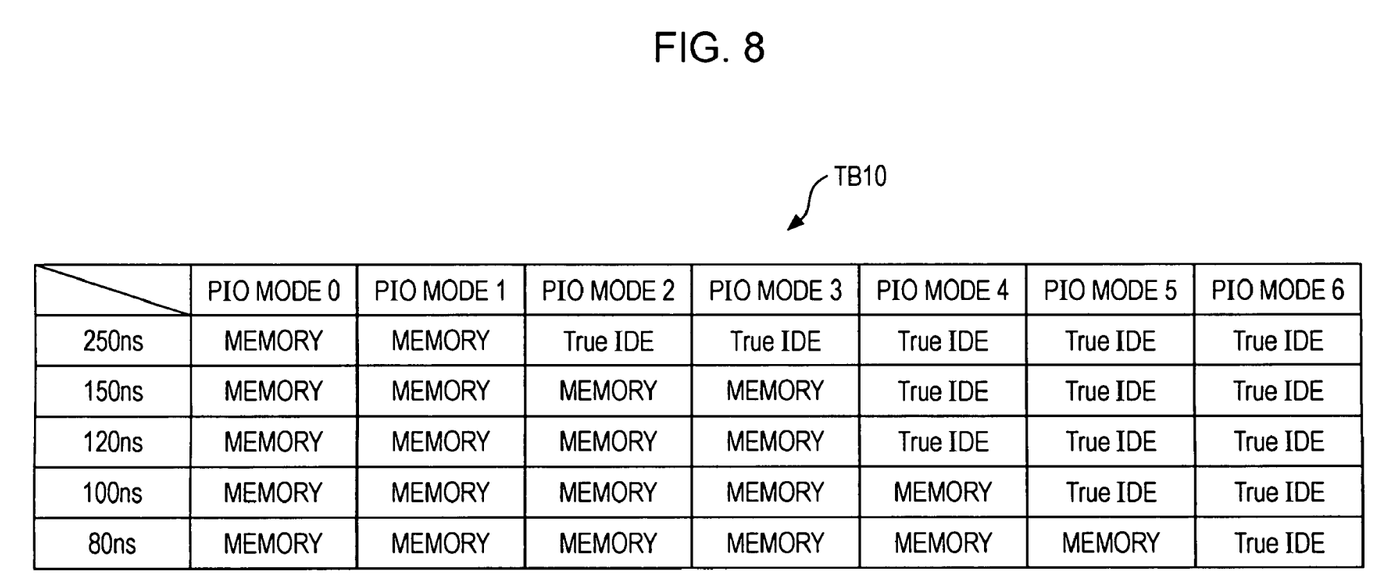
FIG. 8 is an example of a mode selection table used to select an appropriate operation mode for data transmission from among the memory mode and the TrueIDE mode in a case where a CF card is not compatible with the Ultra DMA mode (in a case where the CF card is not compatible with a Read WRITE MULTIPLE command and a WRITE MULTIPLE command).
Figure 9:
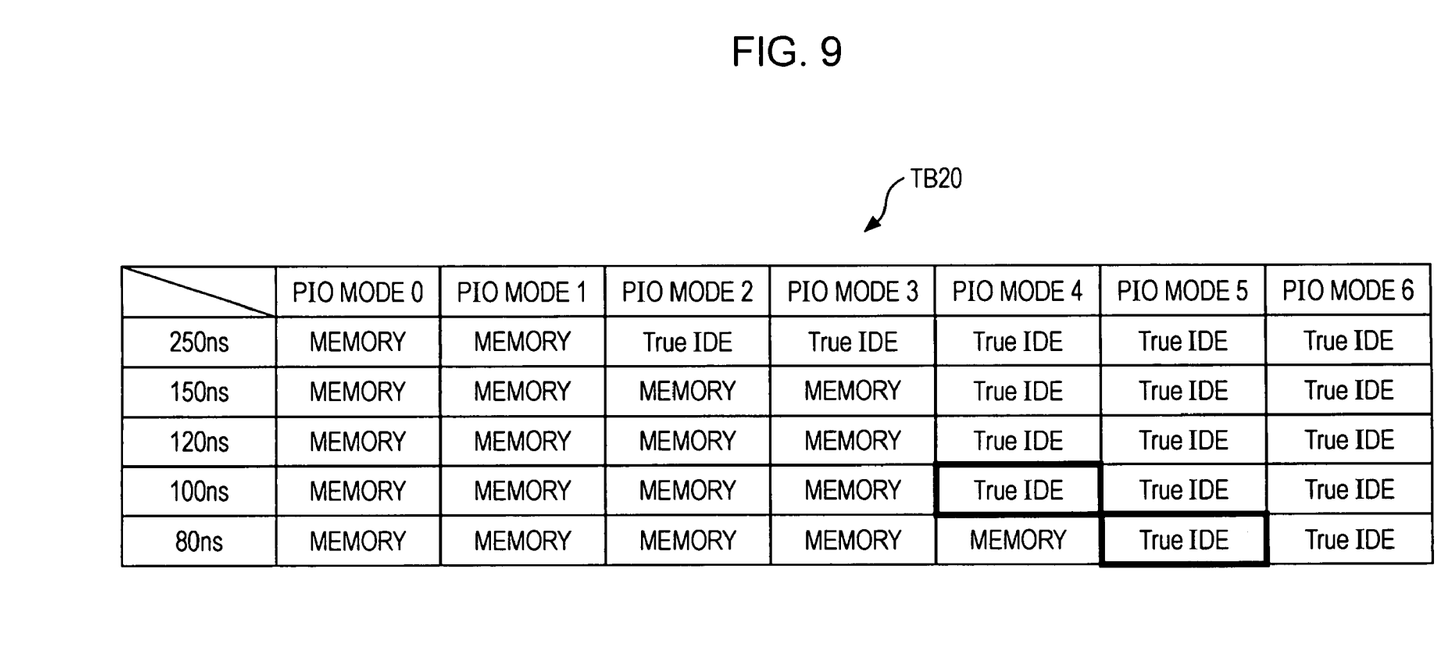
FIG. 9 is an example of a mode selection table used to determine an appropriate operation mode for data transmission from among the memory mode and the TrueIDE mode in a case where a CF card is not compatible with the Ultra DMA mode (in a case where the maximum number of sectors of the Read WRITE MULTIPLE command or the WRITE MULTIPLE command is 2).
Figure 10:
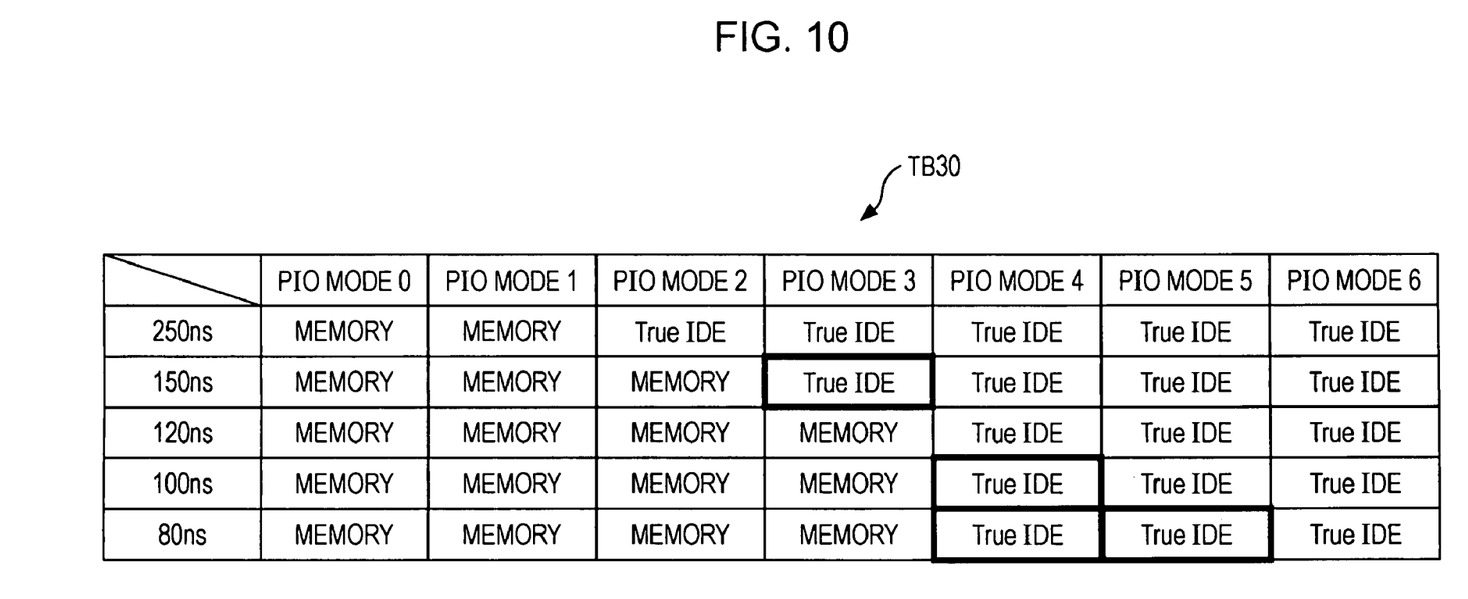
FIG. 10 is an example of a mode selection table used to determine an appropriate operation mode for data transmission from among the memory mode and the TrueIDE mode in a case where a CF card is not compatible with the Ultra DMA mode (in a case where the maximum number of sectors of the Read WRITE MULTIPLE command or the WRITE MULTIPLE command is 4).
Figure 11:
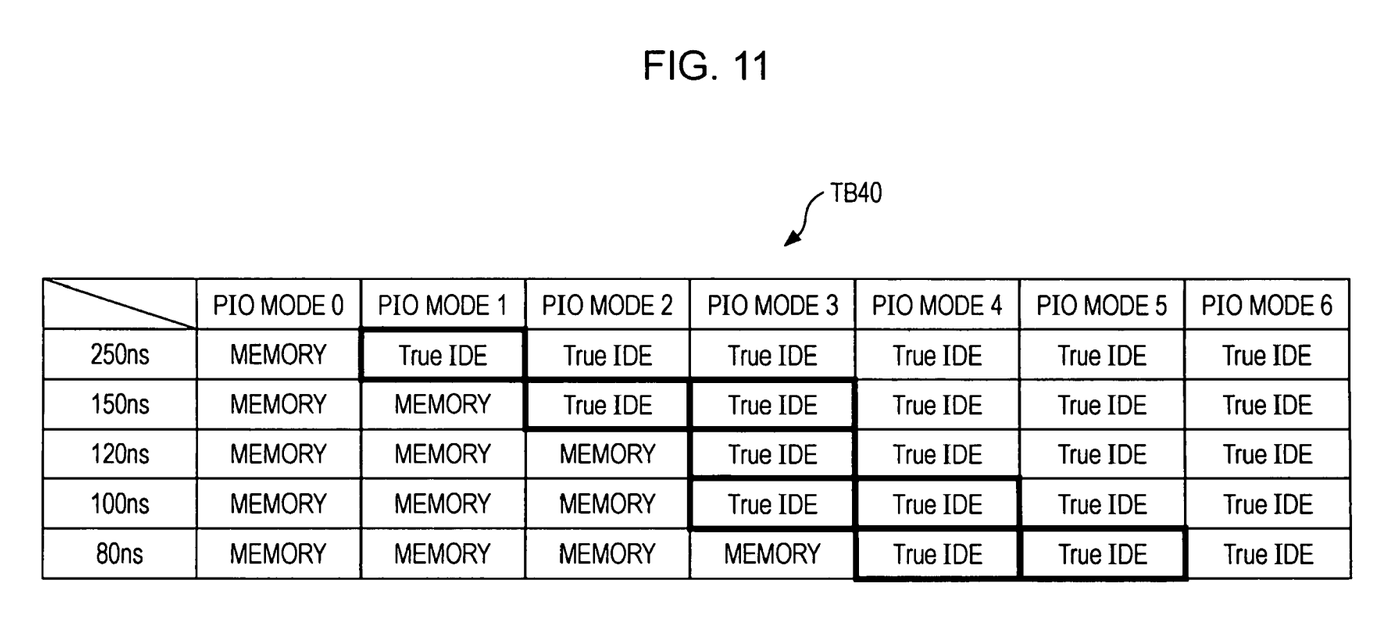
FIG. 11 is an example of a mode selection table used to determine an appropriate operation mode for data transmission from among the memory mode and the TrueIDE mode in a case where a CF card is not compatible with the Ultra DMA mode (in a case where the maximum number of sectors of the a Read/WRITE MULTIPLE command is 8).

FIGS. 8 to 11 show mode selection tables TB10 to TB40 which are used when the CF card 50 does not support the Ultra DMA mode. Specifically, FIG. 8 shows a mode selection table TB10 which is used when the CF card 50 does not support the READ MULTIPLE command and the WRITE MULTIPLE command. FIG. 9 shows a mode selection table TB20 which is used when the maximum number of sectors of the READ MULTIPLE command or the WRITE MULTIPLE command is 2. FIG. 10 shows a mode selection table TB30 which is used when the maximum number of sectors of the READ MULTIPLE command or the WRITE MULTIPLE command is 4. FIG. 11 shows a mode selection table TB40 which is used when the maximum number of sectors of the READ MULTIPLE command or the WRITE MULTIPLE command is 8.

As shown in FIGS. 8 to 11, each of the mode selection tables TB10 to TB40 is used to determine an operation mode which attains the highest communication speed by comparing a cycle time in the memory mode, a PIO mode included in the TrueIDE mode, and a Ultra DMA mode included in the TrueIDE mode with one another. The mode selection tables TB10 to TB40 have the different maximum numbers of sectors.

In this embodiment, in the case where the CF card 50 is compatible with the Ultra DMA mode, the information processing apparatus 10 selects the Ultra DMA mode irrespective of an operation mode in the memory mode and an operation mode in the PIO mode. This is because waiting time for data transmission for a user in the Ultra DMA mode is shorter than waiting time for the data transmission for a user in the memory mode or the PIO mode.

On the other hand, in the case where the CF card 50 is not compatible with the Ultra DMA mode, the information processing apparatus 10 determines an operation mode used for the data transmission on the basis of the mode selection tables TB10 to TB40.

For example, in a case where the CF card 50 is not compatible with the Ultra DMA mode and does not support the READ MULTIPLE command and the READ MULTIPLE command, the information processing apparatus 10 refers to the mode selection table TB10. Then, for example, in a case where the CF card 50 supports a cycle time of 250 ns in the memory mode and is compatible with the PIO mode 1 having a cycle time of 383 ns in the TrueIDE mode, the memory mode is selected as the operation mode.

On the other hand, in a case where the CF card 50 is not compatible with the Ultra DMA mode and the maximum number of sectors of the READ MULTIPLE command or the WRITE MULTIPLE command is 8, the information processing apparatus 10 refers to the mode selection table TB40. Then, for example, in a case where the CF card 50 supports a cycle time of 250 ns in the memory mode and is compatible with the PIO mode 1 having a cycle time of 383 ns in the TrueIDE mode, the TrueIDE mode is selected as the operation mode. Accordingly, in the various cases where the CF card 50 supports the cycle time of 250 ns in the memory mode and is compatible with the PIO mode 1 having a cycle time of 383 ns in the TrueIDE mode, an operation mode to be selected is different for each case due to different conditions, for example, a condition as to whether the CF card 50 supports the READ MULTIPLE command and the WRITE MULTIPLE command and a condition of the maximum number of sectors.

As shown in the mode selection tables TB10 to TB40, since the memory mode and the TrueIDE mode are different from each other, when a period of time required for data transmission in the memory mode is compared with a period of time required for data transmission in the TrueIDE mode, it is not necessarily the case that shorter cycle time attains higher data transmission speed. Therefore, in this embodiment, an operation mode is not simply determined in accordance with a cycle time, and an operation mode which attains higher transmission speed is selected from among a plurality of operation modes by checking periods of time required for data transmission in the memory mode and the PIO mode included in the TrueIDE mode using the mode selection tables TB10 to TB40.

As is apparent from comparison among the mode selection tables TB10 to TB40, the larger the maximum number of sectors of the READ MULTIPLE command or the WRITE MULTIPLE command becomes, the larger the number of cases in which data should be transmitted in the TrueIDE mode becomes. This is because as the maximum number of sectors increases, frequency of interruptions which occur when the data transmission is performed in response to the READ MULTIPLE command or the WRITE MULTIPLE command is reduced, and accordingly, total data transmission time becomes shorter.

For example, the mode selection table TB20 is compared with the mode selection table TB10. In a case where, in the mode selection table TB20, a cycle time of 100 ns is employed in the memory mode and the PIO mode 4 of the TrueIDE mode is employed, the operation mode is changed from the memory mode of the mode selection table TB10 to the TrueIDE mode selected in the mode selection table TB20. Similarly, in a case where, in the mode selection table TB20, a cycle time of 80 ns is employed in the memory mode and the PIO mode 5 of the TrueIDE mode is employed, the operation mode is changed from the memory mode of the mode selection table TB10 to the TrueIDE mode selected in the mode selection table TB20.

For example, the mode selection table TB30 is compared with the mode selection table TB20. In a case where, in the mode selection table TB30, a cycle time of 150 ns is employed in the memory mode and the PIO mode 3 of the TrueIDE mode is employed, the operation mode is changed from the memory mode of the mode selection table TB20 to the TrueIDE mode selected in the mode selection table TB30. Similarly, in a case where, in the mode selection table TB30, a cycle time of 80 ns is employed in the memory mode and the PIO mode 4 of the TrueIDE mode is employed, the operation mode is changed from the memory mode of the mode selection table TB20 to the TrueIDE mode selected in the mode selection table TB30.

For example, the mode selection table TB40 is compared with the mode selection table TB30. In a case where, in the mode selection table TB40, a cycle time of 250 ns is employed in the memory mode and the PIO mode 1 of the TrueIDE mode is employed, the operation mode is changed from the memory mode of the mode selection table TB30 to the TrueIDE mode selected in the mode selection table TB40. Similarly, in a case where, in the mode selection table TB40, a cycle time of 150 ns is employed in the memory mode and the PIO mode 2 of the TrueIDE mode is employed, the operation mode is changed from the memory mode of the mode selection table TB30 to the TrueIDE mode selected in the mode selection table TB40. Furthermore, in a case where, in the mode selection table TB40, a cycle time of 120 ns is employed in the memory mode and the PIO mode 3 of the TrueIDE mode is employed, the operation mode is changed from the memory mode of the mode selection table TB30 to the TrueIDE mode selected in the mode selection table TB40. Similarly, in a case where, in the mode selection table TB40, a cycle time of 100 ns is employed in the memory mode and the PIO mode 3 of the TrueIDE mode is employed, the operation mode is changed from the memory mode of the mode selection table TB30 to the TrueIDE mode selected in the mode selection table TB40.

Note that, in this embodiment, in a case where the CF card 50 is compatible with the Ultra DMA mode, the Ultra DMA mode is unconditionally selected. However, in a case where the CF card 50 is compatible only with the mode 0 in the Ultra DMA mode and compatible only with the PIO mode 6 in the PIO mode, the information processing apparatus 10 may select the PIO mode 6. This is because, as is apparent from comparison between FIGS. 6 and 7, the cycle time of the Ultra DMA mode 0 is 112 ns and the cycle time of the PIO mode 6 is 80 ns, and accordingly, it is expected that transmission time in the PIO mode 6 is shorter than that in the Ultra DMA mode 0. Therefore, in this case, the information processing apparatus 10 may select the PIO mode 6 as the operation mode.

Figure 12:
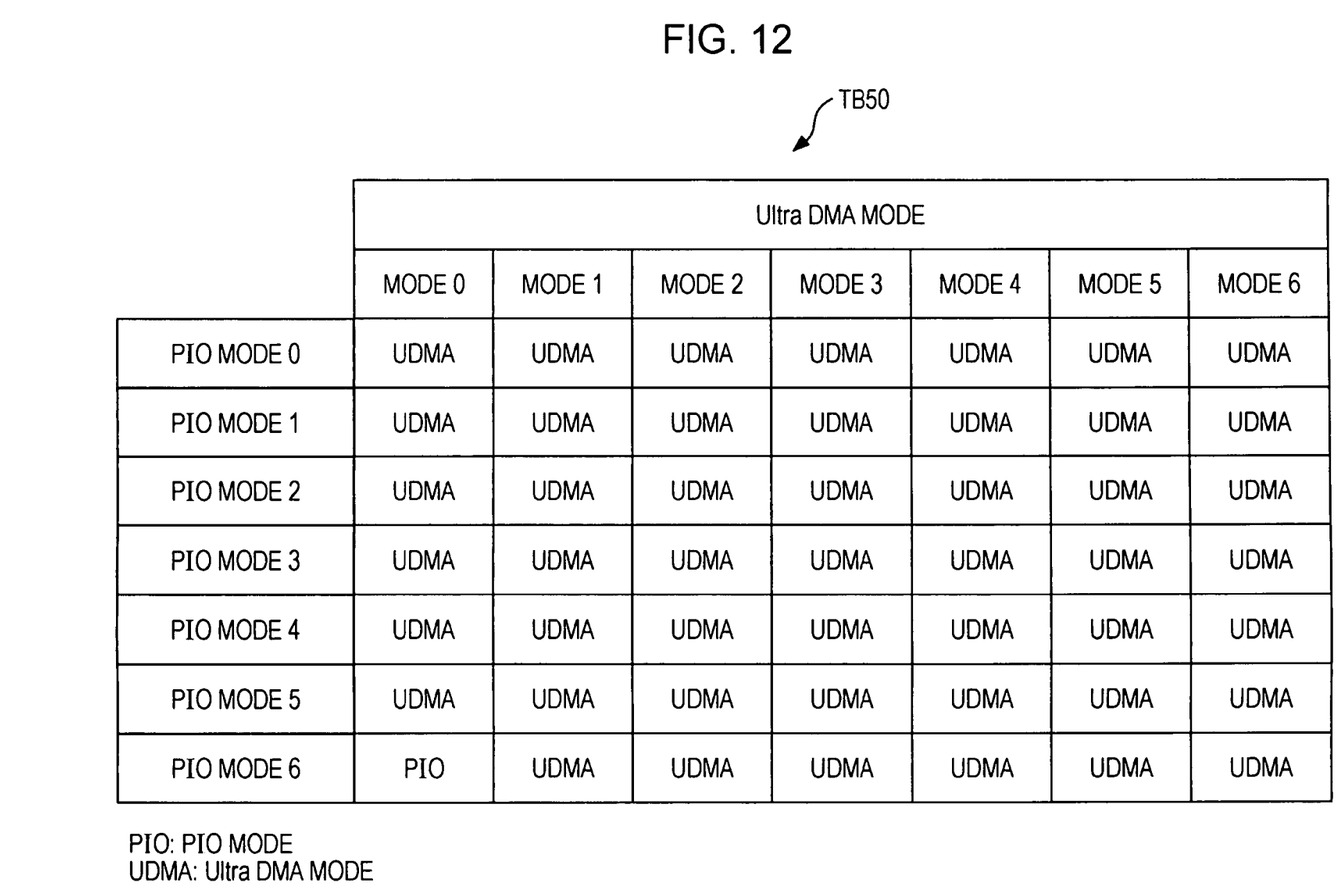
FIG. 12 is an example of a mode selection table used to select an appropriate operation mode for data transmission from among the memory mode and the TrueIDE mode according to a modification of the embodiment.

In order to realize such an operation, the information processing apparatus 10 stores a mode selection table TB50 shown in FIG. 12. The mode selection table TB50 may be stored in the ROM 24 or the hard disk drive 26.

In this case, for example, in a case where the CF card 50 is compatible with the Ultra DMA mode, the information processing apparatus 10 refers to the mode selection table TB50. For example, in a case where the CF card 50 is compatible with the Ultra DMA modes 1 to 6, the Ultra DMA mode is selected irrespective of an operation mode in the PIO mode and an operation mode in the memory mode. This is because data transmission speeds in the Ultra DMA modes 1 to 6 are higher than those in the PIO mode and the memory mode.

For example, in a case where the CF card 50 is compatible with the Ultra DMA mode 0 but is not compatible with the Ultra DMA modes 1 to 6, and in addition, the CF card 50 is compatible with the PIO mode 6, the information processing apparatus 10 selects the PIO mode 6 as the operation mode.

Next, as shown in FIG. 3, the information processing apparatus 10 performs setting of the card controller 60 in step S44. That is, the information processing apparatus 10 performs setting so that the card controller 60 can operate in the operation mode selected in step S42.

Then, as shown in FIG. 4, the information processing apparatus 10 asserts the RESET signal of the CF card 50 in step S50. Subsequently, the information processing apparatus 10 changes the state of the interface provided on the card side of the card controller 60 from the output-available state to the high impedance state in step S52.

In step S54, the information processing apparatus 10 changes the level of the card power-supply controlling signal from the high level to the low level, and the supply of the electric power for a card is stopped. In this embodiment, since a timing in which a request for reading data from or writing data to the CF card 50 is unknown, the supply of the electric power to the CF card 50 is temporarily stopped in order to reduce power consumption. Then, while the supply of the electric power to the CF card 50 is stopped, the information processing apparatus 10 waits for an operation of reading data from or writing data to the CF card 50.

Note that the supply of the electric power to the CF card 50 is stopped at an arbitrary timing. For example, the electric power to the CF card 50 is stopped immediately after the operation of step S42, and alternatively, is stopped after a predetermined period of time (for example, 10 seconds) has passed after the operation of step S42 is performed. In particular, when the CF card 50 is newly inserted into the card slot 40 and when it is expected that the user instructs an operation of reading data from or writing data to the CF card 50 performed for a short period of time, the supply of the electric power to the CF card 50 may be stopped after a predetermined period of time has passed. In a case where the electric power consumed due to the supply of the electric power to the CF card 50 is expected not to be considerably large, the operations performed in step S50 to step S54 may be eliminated. In this case, the electric power for a card is continuously supplied to the CF card 50.

In step S56, the information processing apparatus 10 determines whether an instruction for writing data into the CF card 50 or an instruction for reading data from the CF card 50 is generated. When the determination is affirmative in step S56, in step S58, the information processing apparatus 10 executes an operation of reading data from the CF card 50 or an operation of writing data to the CF card 50 in the operation mode selected in step S42. Note that in the case where the supply of the electric power to the CF card 50 is temporarily stopped, the supply of the electric power should be started when the operation of reading data from the CF card 50 or the operation of writing data to the CF card 50 is performed. After the operation of reading or writing data is completed, the process returns to step S56.

On the other hand, when the determination is negative in step S56, the information processing apparatus 10 determines whether the CF card 50 is removed from the card slot 40 in step S60. Specifically, the information processing apparatus 10 determines whether at least one of states of the signals CD1 and CD2 of the card slot 40 is changed from a low level to a high level to thereby determine whether the CF card 50 is removed. That is, in this embodiment, in step S10, it is determined that the CF card 50 has been inserted into the card slot 40 when the signals CD1 and CD2 are brought to low levels. However, in step S60, it is determined that the CF card 50 is removed from the card slot 40 when at least one of the signals CD1 and CD2 is brought to a high level. When the determination is negative in step S60, the process returns to step S56.

On the other hand, when the determination is affirmative in step S60, the process returns to step S10 of FIG. 2 where the information processing apparatus 10 enters a waiting mode until the CF card 50 is newly detected.

As described above, since the information processing apparatus 10 of this embodiment checks a communication speed in the memory mode, a communication speed in the PIO mode of the TrueIDE mode, and a communication speed in the Ultra DMA mode of the TrueIDE mode so that data communication is effectively performed in an operation mode attaining the highest communication speed, a period of time in which the user have to wait for the data communication between the information processing apparatus 10 and the CF card 50 is reduced as much as possible.

Specifically, it is determined whether the CF card 50 is compatible with the Ultra DMA mode, and when the determination is affirmative, the data communication is performed in the Ultra DMA mode. Even when the CF card 50 is not compatible with the Ultra DMA mode, one of the memory mode and the PIO mode which attains a higher data transmission speed is selected for the data communication. Therefore, among the operation modes compatible with the CF card 50, an operation mode which attains the shortest period of time in which the user have to wait until completion of the data transmission can be appropriately selected.

Furthermore, according to the information processing apparatus 10 of this embodiment, operation modes suitable for individual data transmissions are selected from the memory mode and the TrueIDE mode on the basis of the maximum numbers of sectors obtained when the data transmissions are performed in accordance with the READ MULTIPLE command or the WRITE MULTIPLE command, and the mode selection tables TB10 to TB40 are stored in the information processing apparatus 10. Accordingly, when the CF card 50 supports the READ MULTIPLE command and the WRITE MULTIPLE command, the maximum number of sectors is obtained, and one of the mode selection tables TB10 to TB40 which is suitable for the obtained maximum number of sectors is referred to. By this, an operation mode which attains a higher data transmission speed can be selected.

Since an operation mode to be used for data transmission is determined when the CF card 50 is inserted into the card slot 40, the data transmission is immediately performed when a request for data transmission between the information processing apparatus 10 and the CF card 50 is generated. Therefore, a waiting time for data transmission for a user is made shorter.

Note that the invention is not limited to the foregoing embodiment, and various modifications may be made. For example, although the maximum data size for the data transmission in the TrueIDE mode is determined on the basis of the number of sectors in the foregoing embodiment, a unit of data size for the data transmission is not limited to a sector, and various other units may be employed as the unit of data size. Therefore, in the invention, the maximum data size, which is the maximum value of a cycle in which an interruption is generated at a time of data communication, is determined on the basis of a unit of data size defined in a specification regarding data communication.

Furthermore, although, in the foregoing embodiment, the CF card is taken as an example of a card-type medium in the foregoing description, the invention is applicable to other card-type media as long as each of the card-type media has different two operation modes.

Furthermore, the invention is applicable to various modes in addition to the memory mode, the PIO mode included in the TrueIDE mode, the Ultra DMA mode included in the TrueIDE mode, and the card I/O mode described above. Specifically, since various operation modes are provided for various types of card-type medium, the invention is employed in accordance with the operation modes.

In the foregoing embodiment, a higher communication speed is selected from the communication speed in the memory mode and the communication speed in the PIO mode with reference to the mode selection tables TB10 to TB40 so that an operation mode suitable for data communication is selected. However, the operation mode may be selected in accordance with a certain calculation expression. That is, a method for determining an operation mode which attains a short data transmission time may be arbitrarily changed.

In addition, in the card access processing described in the foregoing embodiment, a program used to execute the card access processing may be recorded in a recording medium such as a flexible disc, a CD-ROM (Compact Disc Read Only Memory), a ROM, or a memory card, and the recording medium may be distributed. In this case, the foregoing embodiment may be realized by reading and executing the program recorded in the recording medium using the information processing apparatus 10.

Furthermore, the information processing apparatus 10 may include an operating system and another program such as an application program. In this case, in order to effectively use the program included in the information processing apparatus 10, a program including an instruction for reading a program which realizes processing the same as that performed in the foregoing embodiment may be selected from among programs included in the information processing apparatus 10 and may be stored in the recording medium.

Moreover, such a program may be distributed not only by being included in a recording medium but also as a carrier. The program is transmitted in a form of the carrier via a network to the information processing apparatus 10, and the foregoing embodiment may be realized by executing the program.

Furthermore, when the program is recorded in the recording medium or when the program is transmitted as the carrier via the network, the program may be encoded and compressed. In this case, the information processing apparatus 10 which received the program transmitted as a carrier or included in the recording medium should execute the program after decoding and decompressing the program.

In addition, in the foregoing embodiment, the card access processing is realized by software. However, the card access processing may be realized by hardware such as an ASIC (Application Specific IC). Alternatively, the card access processing may be realized by cooperatively operating the software and the hardware.

What is claimed is:

1. An information processing apparatus comprising:
a card slot to which a card-type medium is inserted;
a processing unit in communication with the card slot and comprising
a first communication-speed obtaining unit configured to obtain a first communication speed which is a speed of data communication between the information processing apparatus and the card-type medium in a first operation mode;
a second communication-speed obtaining unit configured to obtain a second-communication speed which is a speed of data communication between the information processing apparatus and the card-type medium in a second operation mode;
a third communication-speed obtaining unit configured to obtain a third communication speed which is a speed of data communication between the information processing apparatus and the card-type medium in a third operation mode;
an interruption-preventing maximum data size obtaining unit configured to obtain an interruption-preventing maximum data size which is a maximum data size which allows data communication between the information processing apparatus and the card-type medium without interruption in the second operation mode; and
a determination unit configured to determine an operation mode, from among the first to third operation modes, which attains the highest speed of data communication between the information processing apparatus and the card-type medium on the basis of the first to third communication speeds and the interruption-preventing m maximum data size;
a data communication unit configured to perform data communication between the information processing apparatus and the card-type medium in the operation mode which attains the highest speed of the data communication and which is selected from among the first to third operation modes by the determination unit; and
different mode selection data for a plurality of different interruption-preventing maximum data sizes defined in advance in the second operation mode;
wherein each of the mode selection data is used to select an operation mode which attains the highest speed of data communication in accordance with a combination of a value of the first communication speed and a value of the second communication speed when the data communication is performed in the second operation mode on the basis of a corresponding one of the interruption-preventing maximum data sizes; and
the determination unit selects one of the mode selection data which corresponds to the interruption-preventing maximum data size of the card-type medium inserted into the card slot, and determines an operation mode, from among the first and second operation modes, which attains the highest speed of data communication between the information processing apparatus and the card-type medium with reference to the selected mode selection data.

2. The information processing apparatus according to claim 1,
wherein the first communication-speed obtaining unit obtains the first communication speed when the card-type medium is newly detected in the card slot,
the second communication-speed obtaining unit obtains the second communication speed when the card-type medium is newly detected in the card slot,
the third communication-speed obtaining unit obtains the third communication speed when the card-type medium is newly detected in the card slot,
the interruption-preventing maximum data size obtaining unit obtains the interruption-preventing maximum data size when the card-type medium is newly detected in the card slot, and
the determination unit determines the operation mode which attains the highest speed of data communication from among the first to third operation modes when the card-type medium is newly detected in the card slot.

3. The information processing apparatus according to claim 1,
wherein the card-type medium includes a Compact Flash (registered trademark) card.

4. The information processing apparatus according to claim 1,
wherein the first operation mode corresponds to a memory mode,
the second operation mode corresponds to a PIO mode included in a TrueIDE mode,
the third operation mode corresponds to an Ultra DMA mode included in the TrueIDE mode, and
the interruption-preventing maximum data size corresponds to the maximum number of sectors.

5. The information processing apparatus according to claim 1,
wherein when the card-type medium is compatible with an Ultra DMA mode, the determination unit selects the Ultra DMA mode as an operation mode which attains the highest speed of data communication.

6. A method for controlling an information processing apparatus including a card slot to which a card-type medium is inserted, the method comprising:
obtaining a first communication speed which is a speed of data communication between the information processing apparatus and the card-type medium in a first operation mode;
obtaining a second communication speed which is a speed of data communication between the information processing apparatus and the card-type medium in a second operation mode;
obtaining a third communication speed which is a speed of data communication between the information processing apparatus and the card-type medium in a third operation mode;
obtaining an interruption-preventing maximum data size which is a maximum data size which allows data communication between the information processing apparatus and the card-type medium without interruption in the second operation mode;
determining an operation mode, from among the first to third operation modes, which attains the highest speed of data communication between the information processing apparatus and the card-type medium on the basis of the first to third communication speeds and the interruption-preventing maximum data size;
performing the data communication between the information processing apparatus and the card-type medium in the operation mode which attains the highest speed of the data communication and which is selected from among the first to third operation modes;

defining in advance in the second operation mode different mode selection data for a plurality of different interruption-preventing maximum data sizes, each of the mode selection data being used to select an operation mode which attains the highest speed of data communication in accordance with a combination of a value of the first communication speed and a value of the second communication speed when the data communication is performed in the second operation mode on the basis of a corresponding one of the interruption-preventing maximum data sizes; and selecting one of the mode selection data which corresponds to the interruption-preventing maximum data size of the card-type medium inserted into the card slot, and determining an operation mode, from among the first and second operation modes, which attains the highest speed of data communication between the information processing apparatus and the card-type medium with reference to selected mode selection data.

7. A recording medium having a program stored thereon, the program being executed by an information processing apparatus, the program causing the information processing apparatus to perform the following steps comprising:

obtaining a first communication speed which is a speed of data communication between the information processing apparatus and the card-type medium in a first operation mode;

obtaining a second communication speed which is a speed of data communication between the information processing apparatus and the card-type medium in a second operation mode;

obtaining a third communication speed which is a speed of data communication between the information processing apparatus and the card-type medium in a third operation mode;

obtaining an interruption-preventing maximum data size which is a maximum data size which allows data communication between the information processing apparatus and the card-type medium without interruption in the second operation mode;

determining an operation mode, from among the first to third operation modes, which attains the highest speed of data communication between the information processing apparatus and the card-type medium on the basis of the first to third communication speeds and the interruption-preventing maximum data size;

performing the data communication between the information processing apparatus and the card-type medium in the operation mode which attains the highest speed of the data communication and which is selected from among the first to third operation modes; and defining in advance in the second operation mode different mode selection data for a plurality of different interruption-preventing maximum data sizes, each of the mode selection data being used to select an operation mode which attains the highest speed of data communication in accordance with a combination of a value of the first communication speed and a value of the second communication speed when the data communication is performed in the second operation mode on the basis of a corresponding one of the interruption-preventing maximum data sizes; and selecting one of the mode selection data which corresponds to the interruption-preventing maximum data size of the card-type medium inserted into the card slot, and determining an operation mode, from among the first the second operation modes, which attains the highest speed of data communication between the information processing apparatus and the card-type medium with reference to the selected mode selection data.

* * * * *